United States Patent
Davis

(10) Patent No.: US 6,643,879 B1
(45) Date of Patent: Nov. 11, 2003

(54) POOL ESCAPE RAMP DEVICE FOR ANIMALS

(76) Inventor: Thomas Moore Davis, 2 Pierates Cruze, Mt. Pleasant, SC (US) 29464

( * ) Notice: Subject to any disclaimer, the term of this patent is extended or adjusted under 35 U.S.C. 154(b) by 0 days.

(21) Appl. No.: 10/244,502

(22) Filed: Sep. 16, 2002

(51) Int. Cl.[7] ............................. E01D 1/00; E01D 18/00
(52) U.S. Cl. ..................................................... 14/69.5
(58) Field of Search ........................... 14/69.5, 75, 71.1, 14/72.5; 4/496

(56) References Cited

U.S. PATENT DOCUMENTS

| | | | | |
|---|---|---|---|---|
| 3,891,053 A | * | 6/1975 | Burton | 182/97 |
| 4,630,709 A | * | 12/1986 | Taylor | 182/48 |
| 4,893,363 A | | 1/1990 | Huff | |
| 4,907,674 A | * | 3/1990 | Miller | 182/150 |
| 4,972,540 A | | 11/1990 | Phelps | |
| D346,256 S | * | 4/1994 | Thomas et al. | D34/32 |
| 5,301,630 A | * | 4/1994 | Genovese et al. | 114/375 |
| 5,333,323 A | * | 8/1994 | Aymes | 4/496 |
| 5,829,380 A | * | 11/1998 | Smith | 114/362 |
| D404,143 S | | 1/1999 | Grey, Jr. | |
| D412,224 S | * | 7/1999 | Adler | D30/119 |
| 6,237,166 B1 | | 5/2001 | Stalfire | |
| 6,321,689 B1 | | 11/2001 | Fulmer | |

* cited by examiner

*Primary Examiner*—Thomas B. Will
*Assistant Examiner*—Raymond W Addie
(74) *Attorney, Agent, or Firm*—Kathleen M. Harleston; Harleston Law Firm LLC

(57) ABSTRACT

A ramp device (10, 60) for assisting animals (44) in escaping a swimming pool, or another body of water with a vertical or near vertical side wall, the device comprising; (a) a buoyant central member (12); (b) two generally mirror image, buoyant wing members (13, 14) movably attached to opposite sides of the central member (12), the wing members (13, 14) being smaller in size than the central member (12); (c) movable attachment (16) of the central member (12) to a deck (48) of the pool or the side wall; and (d) a mechanism (23, 24, 65) for maintaining the wing members at a selected angle in relation to the plane of the central member (12); wherein, when the ramp device (10, 60) is in an open, deployed position, the central member (12) floats in the water at a generally horizontal angle in relation to the downward angled wing members (13, 14).

20 Claims, 10 Drawing Sheets

POOL ESCAPE RAMP DEVICE FOR ANIMALS

BACKGROUND OF THE INVENTION

1. Technical Field

The present invention is a ramp device for assisting pets and other animals to escape from a swimming pool, or another body of water with vertical or near vertical walls, without human assistance.

2. Background Information

Swimming pool owners and workers often find, to their regret, that a pet or a wild animal has fallen into an unattended outdoor or indoor swimming pool, either by design or by accident, but was not able to exit the pool and therefore eventually drowned. Family or stray pets, such as dogs and cats, and wild animals, including rats, opossums, squirrels, and raccoons, and a wide variety of large and small insects, are too often found drowned in the family, club or municipal pool, because the animals were unable to find or climb the pool steps or ladder, or to climb the smooth, vertical sides of the swimming pool. In addition to the physical and/or emotional pain suffered by the pet, its owner, and any bystanders, there is the unpleasant task of removing the remains of the domestic or wild animal from the pool. Since the animal's body may have contaminated the pool, the pool must be decontaminated, which often means incurring the expense of costly chemicals and/or draining and refilling the pool. A device is needed that can help animals trapped in a pool to escape, when no human is present to extricate them.

The present invention offers a solution to this problem without the expense of reconstructing or redesigning the pool, and without damage to the swimming pool. The ramp device of the present invention is inexpensive and easy to install, use, and remove.

The present invention is a buoyant ramp device for removable attachment to the deck or wall of a swimming pool or the like. The ramp device includes a generally tombstone-shaped central member having one convexly curved side, and two generally split (half)-tombstone-shaped wing members attached on each of two opposite sides to the central member. The central member is attached by means of flexible straps to the edge of a swimming pool deck, such that the side of the central member opposite the curved side is next to the pool wall, when the ramp device is deployed in the pool water.

BRIEF SUMMARY OF THE INVENTION

A ramp device for assisting animals in escaping a swimming pool, or another body of water with a vertical or near vertical side wall, includes:
(a) a buoyant central member;
(b) two generally mirror image, buoyant wing members movably attached to opposite sides of the central member, the wing members being smaller in size than the central member;
(c) a means of movable attachment of the central member to a deck of the pool or the side wall; and
(d) a mechanism for maintaining the wing members at a selected angle in relation to the plane of the central member;
wherein, when the ramp device is in an open, deployed position, the central member floats in the water at a generally horizontal angle in relation to the downward angled wing members.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
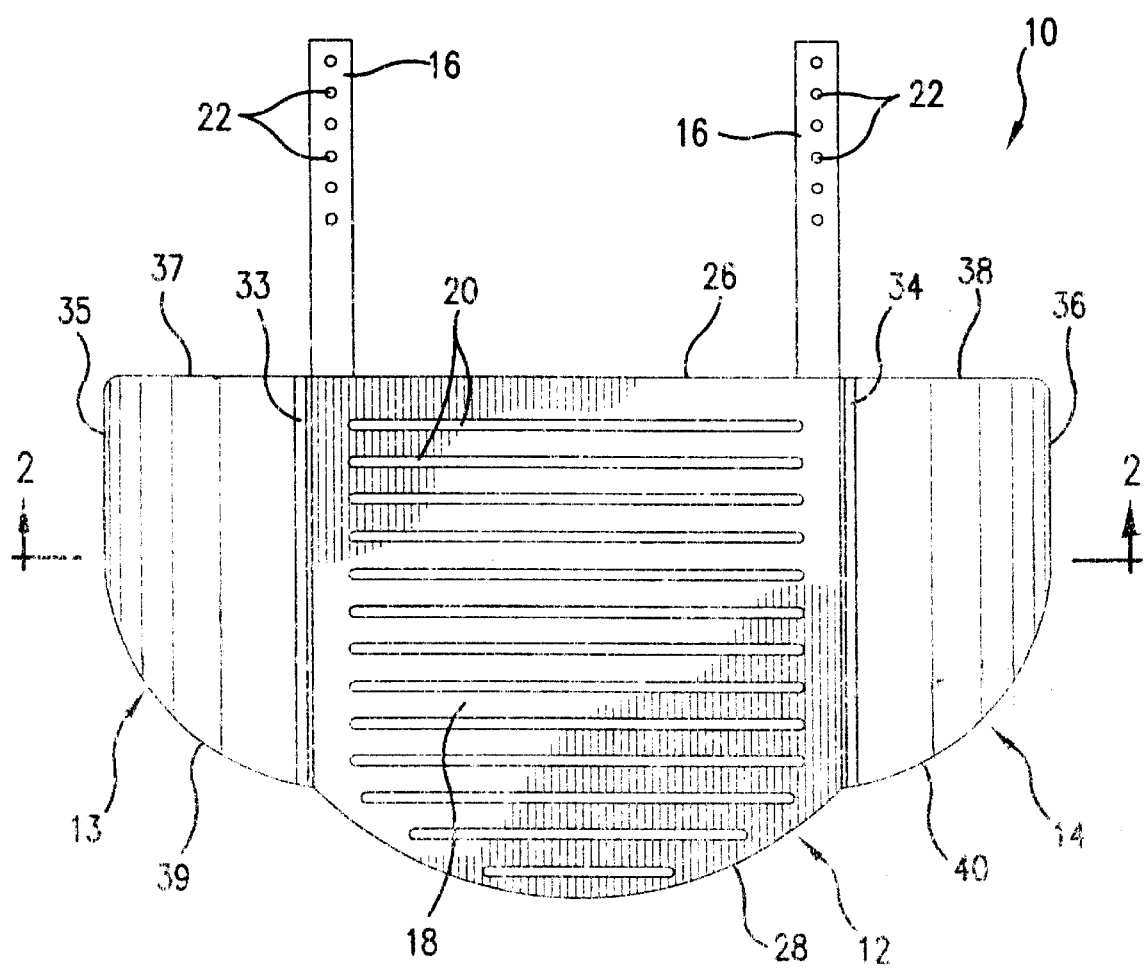
FIG. 1 is a top plan view of a ramp device according to the present invention.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 3:
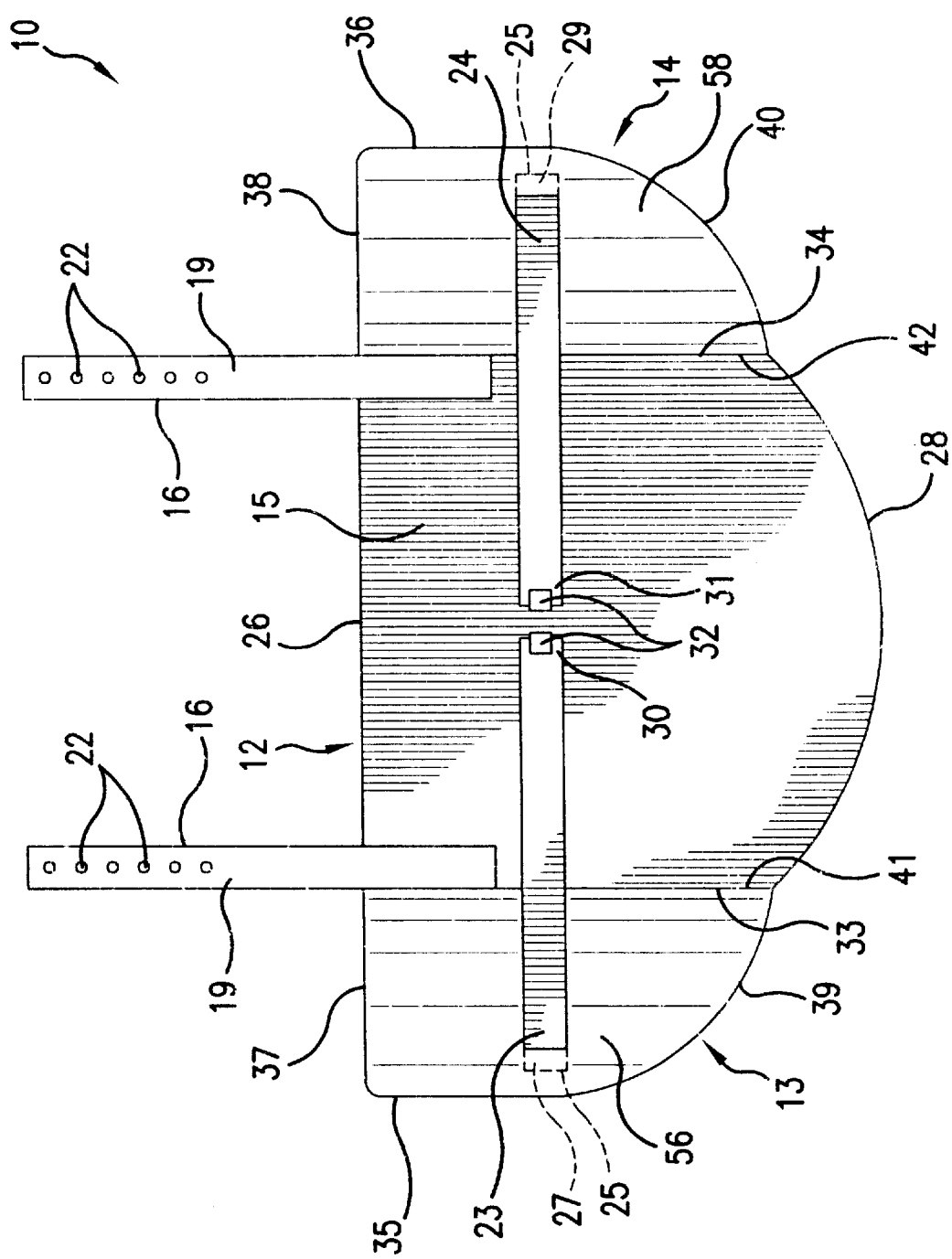
FIG. 3 is a bottom plan view of a ramp device according to the present invention.

Referring to FIGS. 1 and 3, a ramp device, generally referred to as 10, can assist an animal in escaping from a swimming pool or the like. The ramp device 10 includes a central member 12 and two generally mirror image wing members 13, 14 movably affixed to the two opposite sides of the central member 12. The central member 12 is a generally rectangular, planar shaped section made of a buoyant material. An outer, forward one of the longer sides 28 of the central member preferably curves gently outwardly (convexly) for easier access by a swimming animal when the ramp device is in use in a swimming pool. The opposite, rearward, long side 26 of the central member 12 has a straight edge, so that the inner edge of the ramp device remains relatively parallel to the pool wall.

Continuing with FIGS. 1 and 3, the two wing members 13, 14 on opposite sides of the central member 12 are generally split (half) tombstone-shaped, and substantially mirror images of one another. One 39, 40 of the two non-parallel sides 37, 39, 38, 40 of each of the wing members 13, 14 preferably curves outwardly (convexly). The wing members 13, 14 are movably attached to the central member 12, so that the longer 33 of the two parallel sides 33, 35 of the left trapezoidal wing member 13 is contiguous with the left side 41 of the central member 12, and the longer side 34 of the two parallel sides 34, 36 of the right trapezoidal wing member 14 is contiguous with the right side 42 of the central member 12.

The top of a ramp device 10 is shown in FIG. 1, and the bottom of a ramp device is shown in FIG. 3. As seen in FIG. 3, two same-sized, adjustable, flexible straps 16 are attached at one end to the long, rearward, straight edged side 26 of the central member 12, so that the end portions of the straps 16 overlap a portion of the lower surface 15 of the central member 12. A non-overlapping (unattached) portion 19 of each flexible strap 16 extends several inches beyond the rear, long side 26 of the central member 12 in a rearward direction. The non-overlapping portion 19 of each flexible strap 16 is perforated with a row of circular holes 22. Alternatively, the ends of the flexible straps 16 can be embedded in or otherwise affixed to the edge of the rear, long side 26 of the central member, rather than overlapping its bottom surface. Alternatively, the ends of the flexible straps 16 are fused to or looped through a slot in the edges of the central member.

Figure 4:
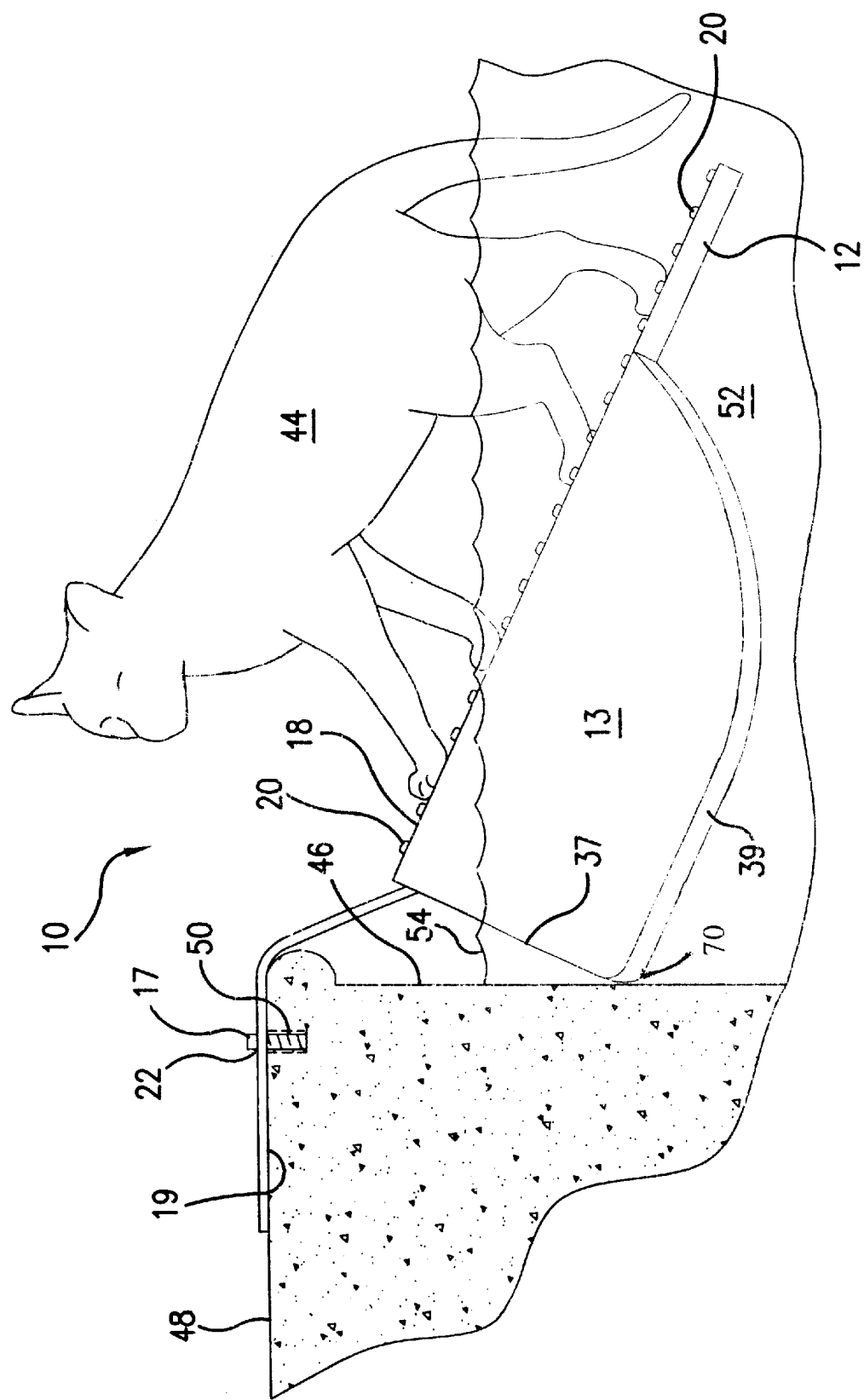
FIG. 4 is a side elevational view of a ramp device according to the present invention, shown in use in a swimming pool.
Figure 5:
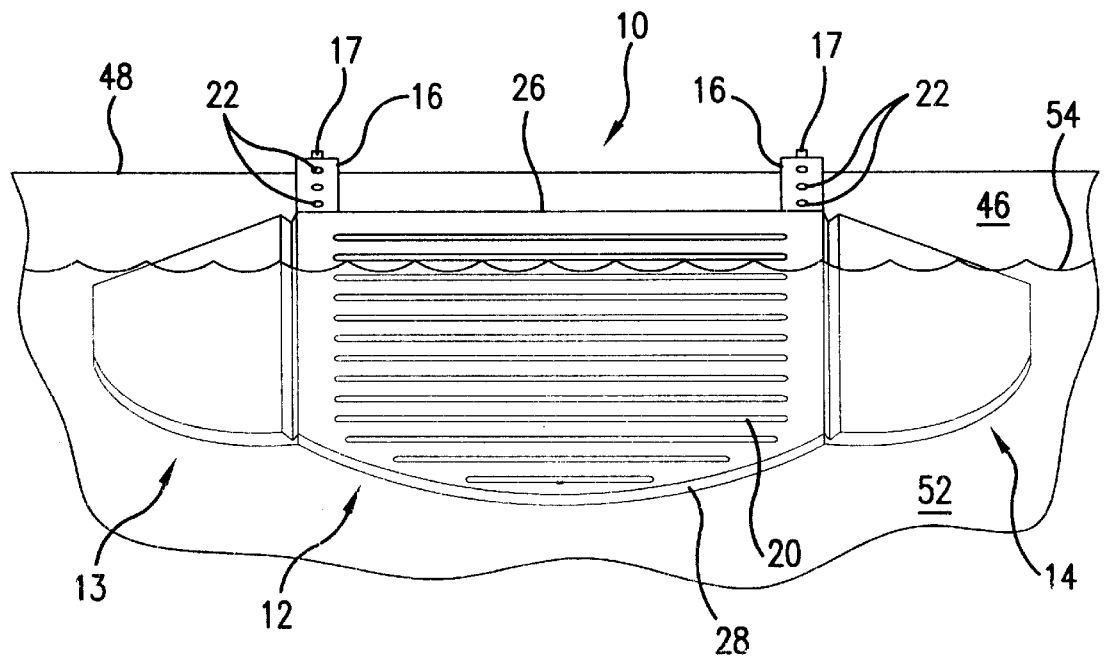
FIG. 5 is a front perspective view of a ramp device according to the present invention, shown in a swimming pool.

Referring to FIGS. 4 and 5, when the ramp device 10 is deployed in the pool water, the flexible straps 16 are secured to the deck 48 of the swimming pool by means of bolts 17, pins, or other similarly sturdy devices affixed through one or more of the strap holes 22 into pre-drilled holes 50 in the pool deck 48. In use, the ramp device 10 is tethered to the side of the pool by the flexible straps 16 attached to its leading edge 26, while the rest of the device floats near or on the surface of the pool water 52. The adjustable, flexible straps 16 allow the buoyant ramp device 10 to be adjusted according to the water level 54. Small trapped animals 44 can use their back feet and legs to push themselves up the ramp device 10 and out of the water. The extension of the front of the ramp device 10 beneath water level allows the animal to engage its rear feet on the central member and successfully climb up the ramp device. The flexible straps 16 allow use of the ramp device in a variety of pools or ponds, with various deck overhangs (coping) or embankments.

The ramp device 10 is intended for use in any above or below ground swimming pool, or in any pond, lake, or other natural or artificially created body of water with a border extending around part or all of its circumference, e.g., a lake with a bulkhead or other type of embankment or wall.

As shown in FIGS. 4 and 5, the series of holes 22 in the straps 16 allows the pool owner or employee to adjust the position of the straps 16 and the ramp device 10 according to the particular pool design and its water level 60, by simply pulling each strap 16 off the stationary bolt 17 or pin in the pool deck, and pushing a different hole 22 of the strap down over the bolt 17. Other means of securing the ramp device 10 to the pool deck or pool side wall can also be used, such as several ties along the long, rear edge 26 securing the floating ramp device to a pool ladder. For an above ground swimming pool, for example, the flexible straps 16 can be wrapped up over the top edge of the pool wall and affixed to the outside of the pool wall. The ramp device 10 is preferably left deployed in the water on the side wall 46 of the swimming pool, where it is out of the way. Alternatively, the device can be flipped up out of the water onto the pool deck and replaced in the pool as desired.

Figure 2:
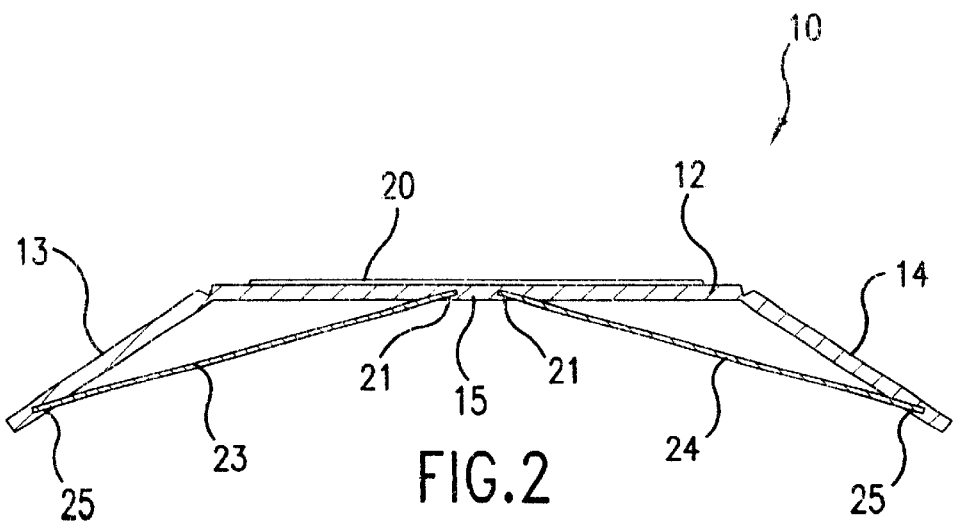
FIG. 2 is a cross-sectional view of the ramp device according to FIG. 1, taken across line 2—2.

Turning again to FIGS. 1 and 3, and to the cross-section shown in FIG. 2, the wing members 13, 14 are hinged to the central member 12, so that they can be adjusted to different angles relative to the central member 12. When in use, the wing members 13, 14 will typically be angled in a downward direction from the central member 12 into the pool water 52, preferably at an angle of between about twenty degrees (20°) and ninety degrees (90°) relative to the longitudinal axis of the central member 12, more preferably at an angle of between about thirty (30) and forty-five (45) degrees. The user selects and sets the angle of the wing members 13, 14, which are preferably the same as one another, according to the amount of pool deck overhang and the level of the water in the pool or other body of water the ramp device 10 is used in.

Referring to FIGS. 4 and 5, when an animal 44, such as a cat, uses the ramp device 10 to exit the pool, its weight causes the trailing, front edge 28 of the central member 12 of the ramp device 10 to sink down into the water. The fixed wing members 13, 14 will contact the side wall 46 of the swimming pool, stabilizing the ramp device 10 and preventing it from sinking further, so that it will be sloped downward at an appropriate angle for allowing the animal to engage the ramp device 10 and climb from there to the pool deck. The upper surface 18 of the central member 12 may also be corrugated or otherwise constructed with grooves or ridges 20, or any suitable non-skid coating or surface layer, making it easier for the animal 44 to grip the upper surface 18 and ascend the ramp device 10.

Referring to FIGS. 2 and 3, spanner members 23, 24 preferably join the wing members 13, 14 to the lower surface 15 of the central member 12. The spanner members 23, 24 are preferably made of a relatively rigid material so that they can maintain the position of the wing members 13, 14. Each spanner member 23, 24 attaches to the lower surface 56, 58 of the corresponding wing member 13, 14, close to the outer wing edge 35, 36 and approximately halfway between the leading, rear wing edge 37, 38 and the trailing, front wing edge 39, 40, running parallel to the rear, straight side 26 of the central member 12 and being attached to the central member 12 at a point generally near the center of the lower surface 15 of the central member 12. The points of attachment to the central member 12 may be varied, thereby varying the angle of the wing members 13, 14. The spanner members 23, 24 may be fixed at the desired point so that the wing members 13, 14 will remain at the desired angle.

As shown in FIG. 2, the spanner members 23, 24 are inserted in support inner slots 21 on the lower surface 15 of the central member 12, and the opposite, outer ends of the spanner members are inserted in corresponding support outer slots 25 in the lower surfaces of the wing members 13, 14.

The outer ends 27, 29 of the spanner members 23, 24 are preferably hinged or otherwise movably affixed to, or in the area of, the outer edges 35, 36 of the wing members 13, 14. As shown in the embodiment of FIG. 3, the spanner members may detachably attach to the lower surface 15 of the central member 12 by means of a snap or clasp mechanism 32 extending across the lower surface 15 of the central member 12 in line with the spanner members. In a preferred embodiment, clasp members 32 on the lower surface 15 of the central member 12 removably clasp the inner ends 30, 31 of the spanner members 23, 24. Support outer slots 25 in the lower surfaces of the wing members receive the outer ends 27, 29 of the spanner members 23, 24. A series of snaps can be employed in place of clasp members.

Figure 6:
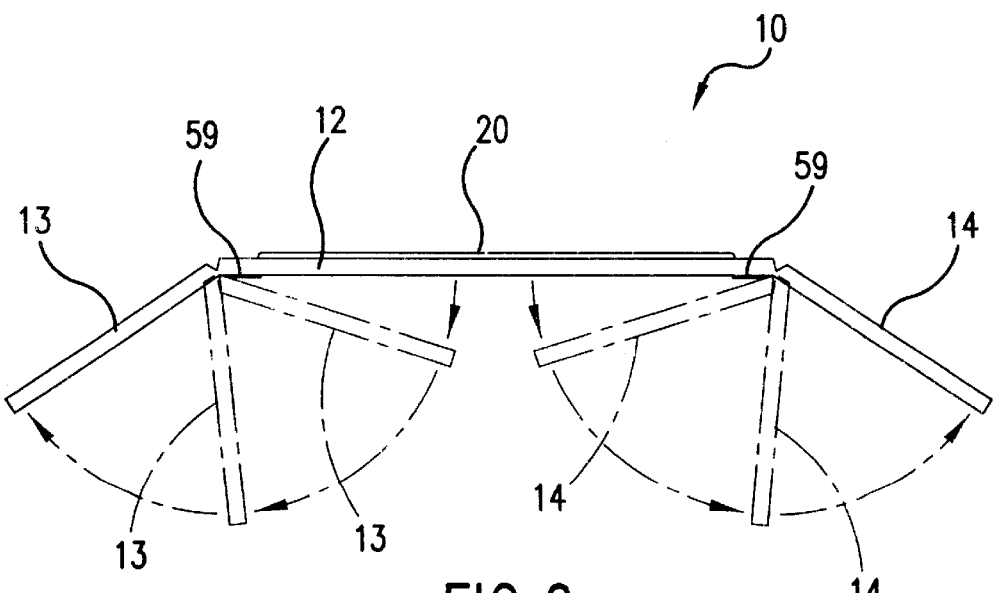
FIG. 6 is a rear elevational view of a ramp device according to the present invention, showing the adjustable positions of the wing members.

As seen in FIG. 6, which is shown without straps or spanner members, hinged attachments of the wing members 13, 14 to the central member 12 allow a full range of motion from zero (0°) to about one-hundred-eighty (180°) degrees. Since each wing member 13, 14 is no more than one-half the width of the central member 12, the ramp device 10 is collapsible by folding the wing members 13, 14 all the way in beneath the central member 12. This allows for convenient storage of the ramp device 10. In the collapsed position, the ramp device 10 also fits easily into a conventional size box for shipping and sale. The wing members 13, 14 are attached to the central member by means of hinges 59 affixed under the ramp device 10 between the inner edge of the left wing member 33 and the left side of the central member 41, and the inner edge of the right wing member 34 and the right side 42 of the central member 12.

Alternatively, strips of a flexible tape can be employed in place of hinges to connect the wing members to the central member. Alternatively, the central member 12 and wing members 13, 14 are unitary (one-piece) and separated by creases or folds in the construction material. This embodiment has the same appearance as illustrated in FIGS. 1 and 2. In this embodiment, the spanner members maintain the selected position of the wing members.

The ramp device 10 may be constructed of any water-resistant, non-sinkable, lightweight, sturdy material, such as wood, plastic, or another material of sufficient buoyancy and strength to support the weight of a small or relatively small animal. The dimensions of the ramp device may vary, but generally it will be of sufficient size to allow access by a medium-sized dog. A larger size can be made to accommodate large dogs or other large animals. Prior to use by a trapped animal, the central member 12 floats near the surface of the pool water 52 with the front portion of the device 10 on or just below water level 54 and the rear portion, which is tethered to the pool deck, above water level. The wing members 13, 14 are angled down, each preferably forming an angle of between about 30 and 45 degrees in relation to the central member 12.

To use the ramp device 10, the swimming or floundering animal 44, such as a cat or dog, places first one paw or leg and then the other on a front portion of the central member 12, gaining purchase on the grippable ridges 20 or any suitable, nonslip surface or coating on the central member 12. Alternatively, a relatively rigid central member and wing members include a plurality of parallel slits 20A to help the animals grip the device. These slits look like the ridges 20 shown in FIG. 1.

As shown in FIG. 4, the front portion of the ramp device 10 sinks down with the added weight of the animal 44, allowing the animal's rear feet to engage the partially submerged ramp, and push its body up the sloped central member. This pushes the rear edges 37, 38 of the wing members 13, 14 against the adjacent side wall of the pool, to maintain an appropriate angle and support the weight of the animal as it clambers up on the ramp device 10. Once the trapped animal 44 pushes against the ramp device 10, the rear corners 70 of the two wing members 13, 14 contact the side wall 46 of the swimming pool (or embankment), which braces the device 10 against the weight of the animal 44. The wet animal 44 can then jump over the small gap between the end of the ramp device 10 and the pool wall 46 onto the pool deck 48.

The wing members 13, 14 are angled to the plane of the central member 12, and oriented downward (generally toward the bottom of the pool), so that if the central member 12 is pushed downward in the water by the weight of an animal, the wing members 13, 14 will contact the side wall 46 of the pool at the rear corners 70 of the wing members, as shown in FIG. 4. The wing members stop the downward plunge of the central member and prevent the ramp from sinking to a point where it cannot function as an escape ramp.

Figure 7:
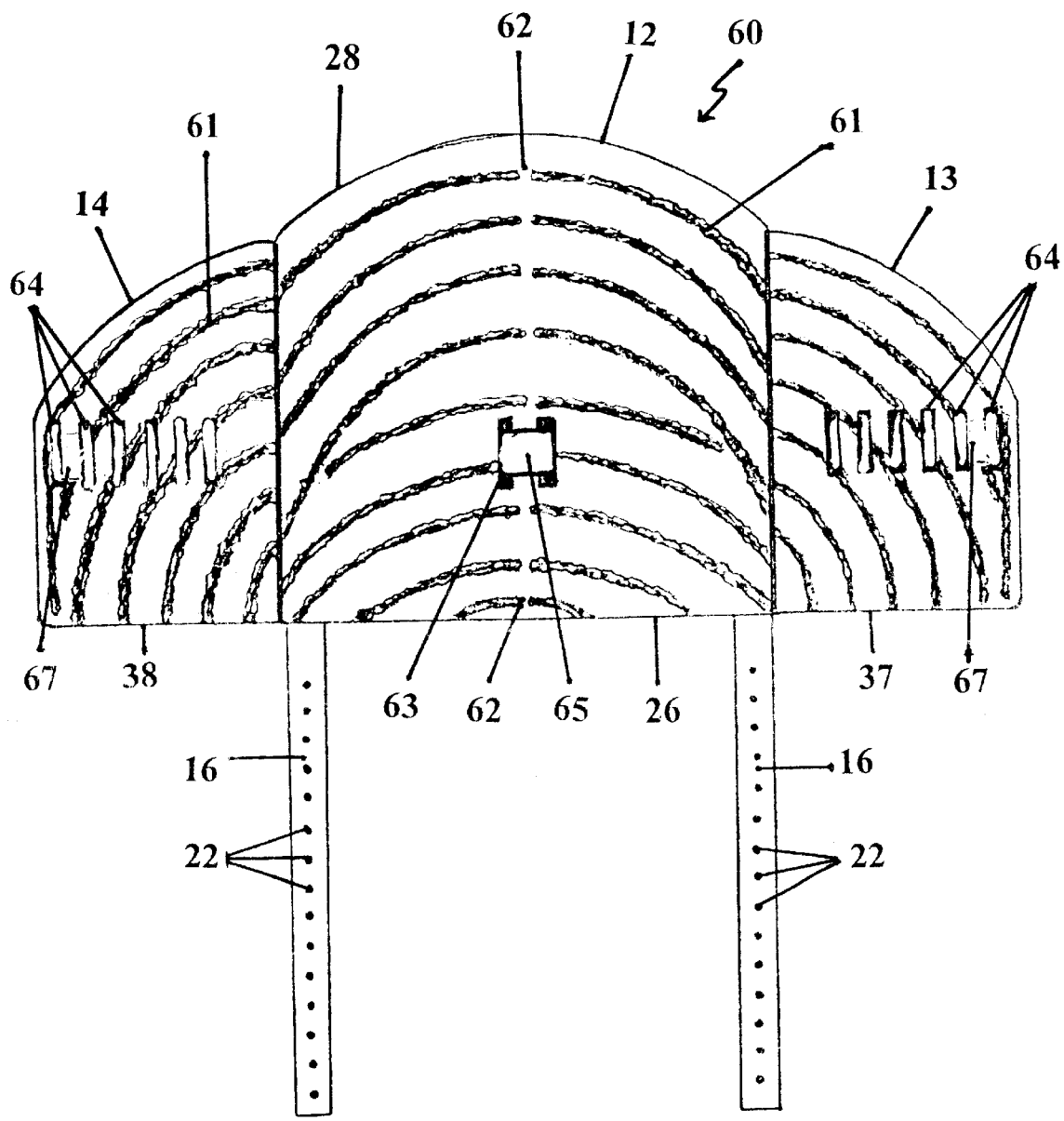
FIG. 7 is a top plan view of an alternate embodiment of a ramp device according to the present invention.

Turning to the alternate embodiment 60 of the ramp device shown in FIG. 7, the upper surface of the central member 12 and the wings 13, 14 includes a curved series of concentric ridges 61. These ridges are curved so that they are easier for an animal's nails and wet paws to grasp when the animal approaches from one side of the device. The curved ridges 61 are broken along a centerline 62 on the central member 12. This broken centerline 62 is for drainage from the elevated rear side 26 down into the pool.

Figure 8:
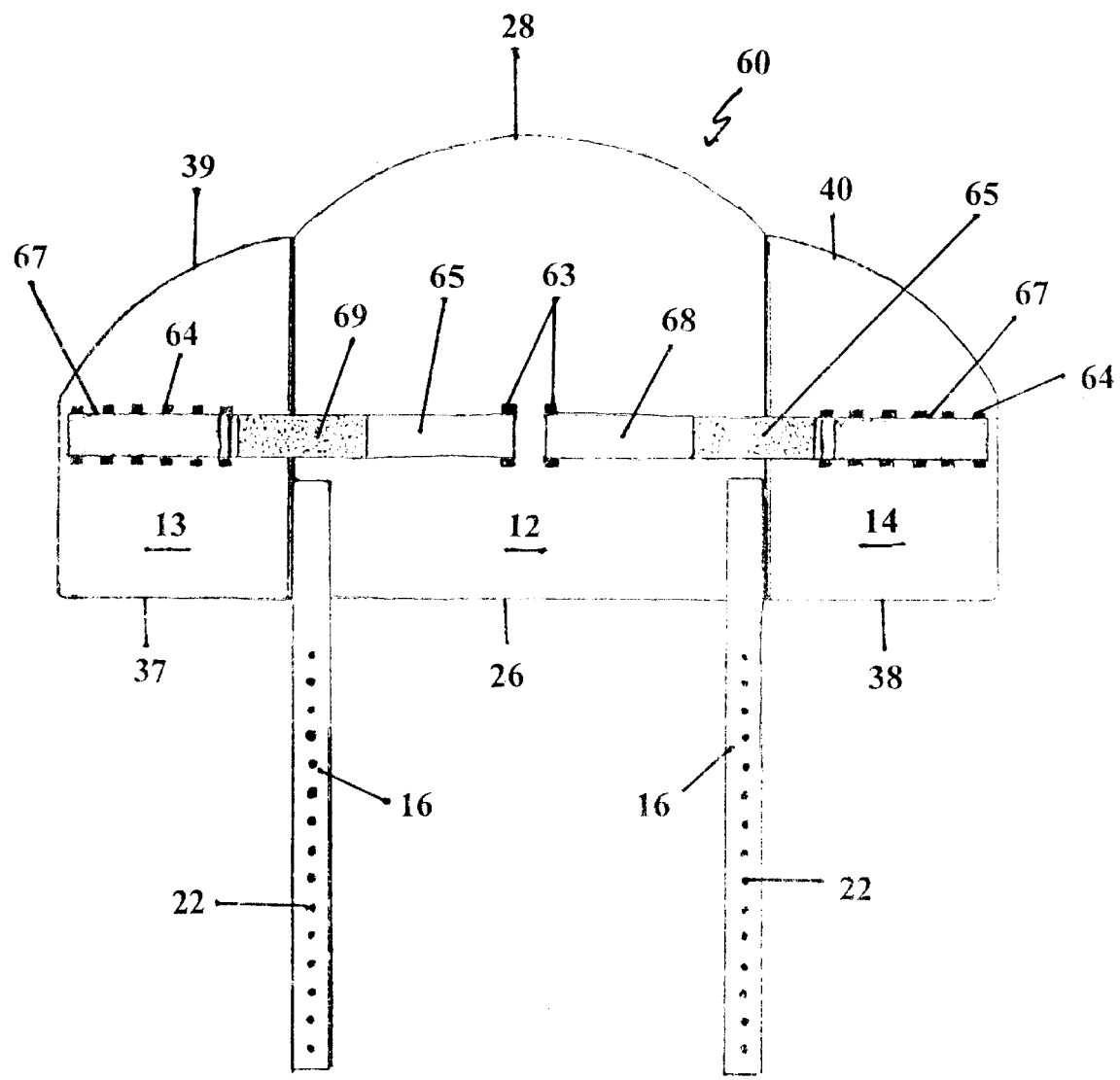
FIG. 8 is a bottom plan view of a ramp device according to the present invention.
Figure 9:
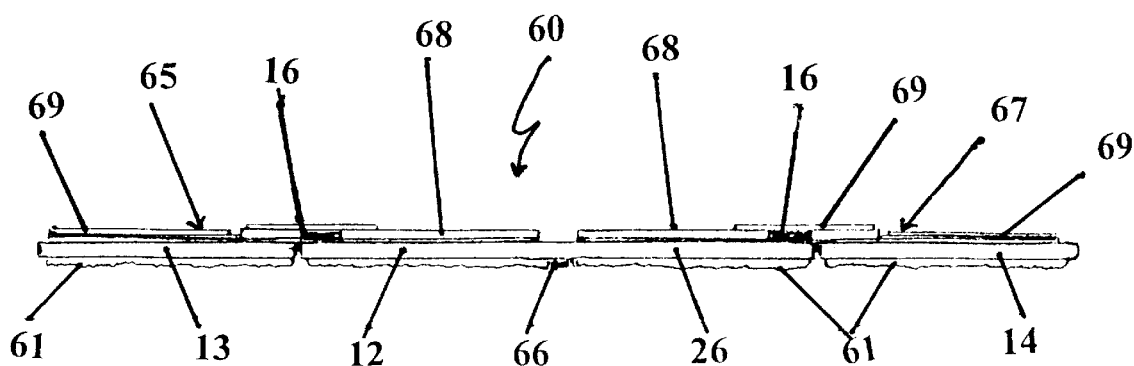
FIG. 9 is an end, elevational view of the ramp device according to the present invention.
Figure 9A:
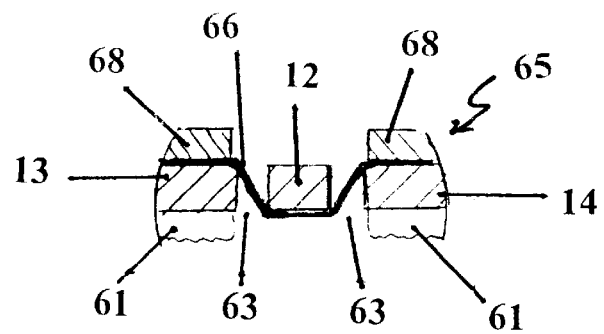
FIG. 9a is a cutaway view of a central flexible area of a spanner brace at central slots of the ramp device according to FIG. 8.

As shown in FIGS. 7 (top) and 8 (bottom), this embodiment 60 includes a set of central slots 63 in the central member 12, and a series of spaced-apart wing slots 64 in the wing members 13, 14. A spanner brace 65 is interlaced through the central slots 63, and then its ends are interlaced through the desired wing slots 64, preferably through corresponding slots 64 on each wing member, to maintain the wing members in their deployed, ready for use, open position. The slots 63, 64 are substantially equal in size and are slightly longer than the spanner brace 65 is wide, so the spanner brace fits closely through them. As shown in FIGS. 8, 9 and 9a, the spanner brace 65 is preferably made of a single, substantially rigid strip of material, with a flexible center joint, such as a nylon-type material, at its center 66 and its ends 67, where it passes through the central slots 63 and wing slots 64, respectively.

The ramp device 60 is stored and shipped in a storage position in a conventional box. In the storage position, the wing members 13, 14 are folded against the central member 12, and the spanner brace 65 is folded next to the rest of the device in the box. The wing members 13, 14 are preferably each one half of the width of the central member 12, so they fit into the box without overlapping. The flexible straps 16 are folded down over the rest of the device in the box. The user removes the ramp device 60 from the box, flattens out the wing members 13, 14 to the same plane as the central member 12, unfurls the spanner brace 65, and inserts one end of the spanner brace through each of the central slots 63, and then through two of the end slots 64 in each wing member. This action pulls the wing members 13, 14 down into the deployed, standoff position.

Continuing with FIGS. 8, 9 and 9a, which show a preferred embodiment of the ramp device 60 in a flat, non-deployed position from the bottom (FIG. 8) and rear end of the ramp device (FIG. 9), the central flexible area 66 of the spanner brace 65 extends between the two central slots 63 when the spanner brace is on the device. FIG. 9a shows the central flexible area 66 of the spanner brace 65 extending over the central member 12 and through the central slots 63 in the central member 12. The two opposite ends of the central flexible area 66 are affixed to the rigid portions 68 of the spanner brace 65. The rigid strap portions 68 extend beneath the central member 12 to the wing slots 64 on either side.

Figure 10:
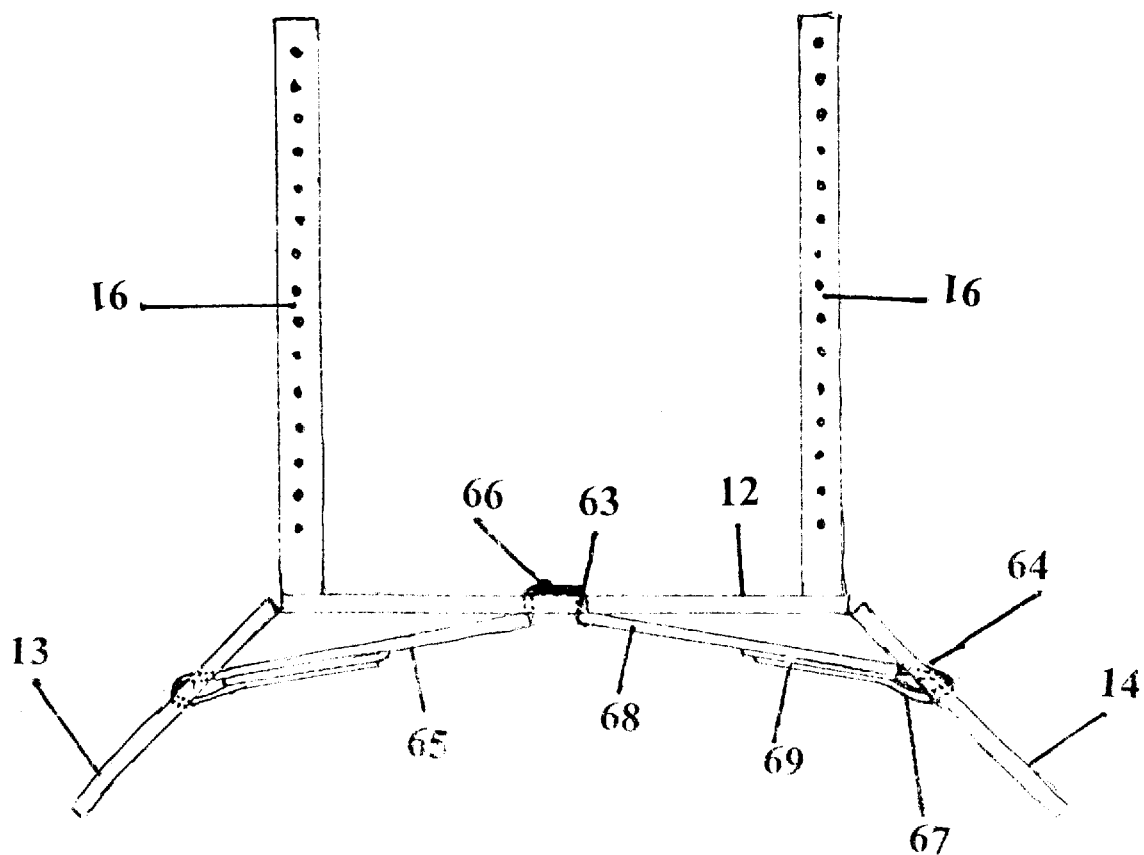
FIG. 10 is an end, elevational view of a ramp device according to the present invention.
Figure 10A:
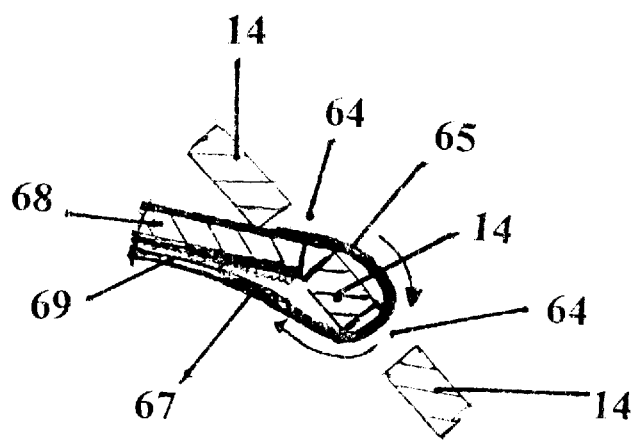
FIG. 10a is a cutaway view of the ramp device according to FIG. 10.

As shown in FIGS. 10 and 10a, the end portions 67 of the spanner brace 65 are overlaid with strips of hook and loop material 69. A hook and loop strip 69 glued or otherwise affixed to the end of each end portion 67 lies adjacent to a corresponding strip of hook and loop material affixed to the end portion. After the ends of the spanner brace 65 have been inserted through the desired wing slots 64, as shown in FIG. 10a, the outermost strip of hook and loop is pressed down onto the adjacent hook and loop strip. A user can adjust the wing members 13, 14 to a desired angle according to the choice of wing slots 64 and how tightly the hook and loop strips 69 on the brace end portions 67 are fastened. The wing members are thus adjustable. The hook and loop strips 69 maintain the wing members 13, 14 in the deployed position, even under the weight of a dog on the central member 12. Any suitable means of attaching the end portions 67 to the rest of the spanner brace 65 may be employed instead of the preferred hook and loop strips.

Figure 11:
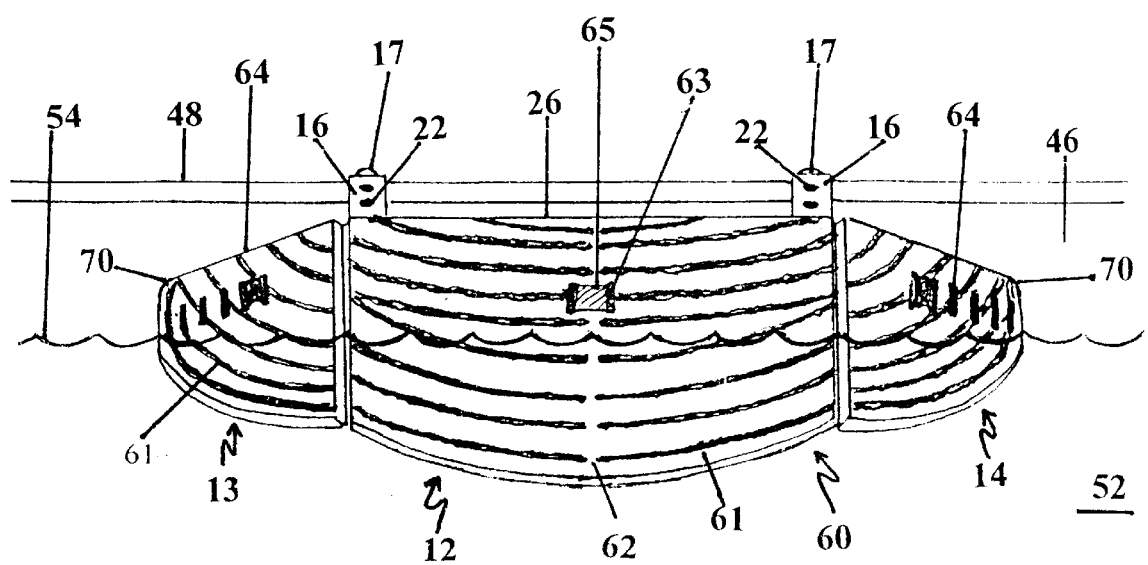
FIG. 11 is a front perspective view of an alternate embodiment of a ramp device according to the present invention, shown in a swimming pool.
Figure 12:
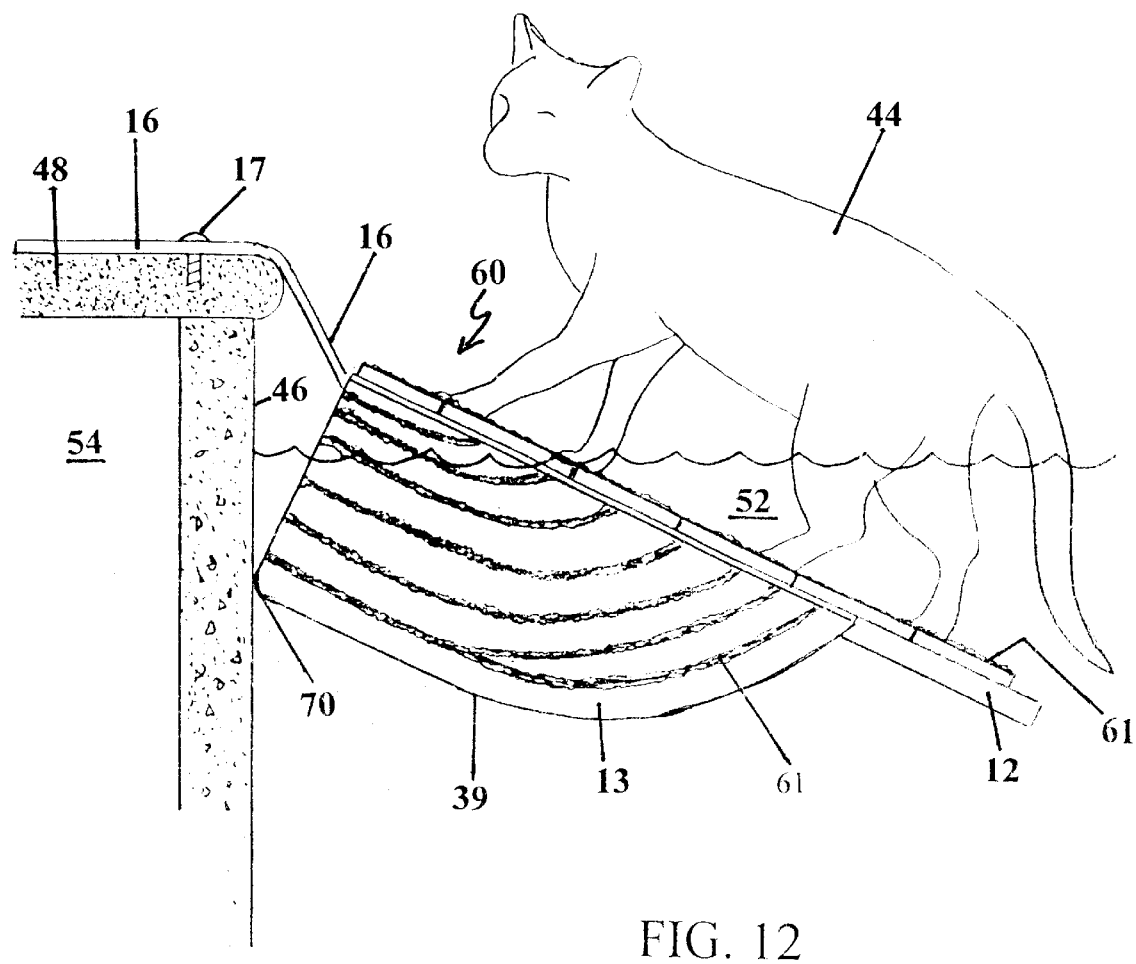
FIG. 12 is a side elevational view of a ramp device according to the present invention, shown in use in a swimming pool.

Referring to FIGS. 11 and 12, the alternate embodiment 60 of the ramp device is shown deployed in a swimming pool. In FIG. 11, the ramp device 60 with its contoured ridges 61 is floating in the pool water 52. Once a trapped animal pushes against the ramp device 60, the rear corners 70 of the two wing members 13, 14 contact the side wall 46 of the swimming pool (or embankment), which braces the device against the weight of the animal. When the animal 44 mounts the central member 12, the flexible straps 16 are pulled taut, as shown in FIG. 12. Here, the flexible straps 16 are mounted to the pool deck 48 by bolts 17 extending through the chosen hole 22 in the flexible strap 16. The heads of the bolts 17 are preferably rounded so that they do not injure the feet of people or animals on the pool deck. Other suitable means of mounting the flexible straps 16 to the pool deck or embankment may be employed.

This ramp device 10, 60 is suitable for helping animals such as mammals (e.g., dogs, opossums, armadillos, squirrels, raccoons, rats), amphibians (e.g., frogs, lizards), reptiles (e.g., turtles, alligators, snakes) and insects (e.g., crickets, beetles, spiders) to escape from the pool or pond in which the ramp device is placed. The subject animals normally mount the ramp device 10, 60 and then leap or scuttle onto the pool deck 48, or pond embankment, as quickly as possible, since they desire to spend as little time as possible in the water. Most animals 44 are large enough to jump over the slight gap between the rear edge 26 of the central member 12 and the pool wall 46, though smaller animals can travel up the flexible straps 16.

It is also conceivable that a sturdy, larger sized ramp device could be used in an emergency by an unattended, panicked toddler, or a handicapped child or adult, who has fallen into the pool and is having trouble exiting via its slippery vertical side walls.

When it is in use, the central member 12 is preferably not held at a vertical orientation with respect to the sides of the swimming pool, or to an upper part of the central member. Of course, the great majority of animals cannot climb a vertical surface. The central member 12 and the wings 13, 14 of the ramp device 10, 60 are not made of netting and the ramp device 10, 60 does not require a weighted cylinder at its lower end to hold the device in the water at a vertical orientation to the pool side.

When it is in use, the ramp device 10, 60 preferably floats freely in the pool, attached to the pool deck or side wall only by the flexible straps 16. The ramp device 10, 60 does not require suction cups attached to the pool sides for stability; the rear edges of the wing members 13, 14, and the taut straps 16, brace the ramp device 10, 60 against the side of the pool when an animal weighing more than a few ounces is on the ramp device. The ramp device of the present invention is not a conventional shelf or table which hangs down rigidly into a pool from the pool side, and which can pose a hazard for pedestrians on the deck, especially at night. The present device remains along the edge of the pool, and does not pose a safety hazard or block the pool deck.

When the ramp device 10, 60 is in the pool, the wing members 13, 14 are oriented below the central member 12 and the central member is angled slightly down into the pool water 52. Surprisingly, the angled wing members 13, 14 ameliorate the effect of the waves on the buoyant ramp device, and provide a more stable device, even under the weight of the animal. The floating central member is at a forward angle (preferably approximately 20 to 45 degrees) with respect to the horizontal surface of the pool water. The angled wing members 13, 14 maintain the central member 12 at a climbable angle in the water when weight is applied to the central member 12.

The wing members 13, 14 of the present ramp device 10 prevent the device 10 from sinking to a vertical or near vertical position, suspended on one end to the pool wall or deck, when an animal weighing more than a few ounces climbs on it. Such an animal is very likely to slide back into the pool off a device which moves to a vertical (or near vertical) positioned device. The ramp device of the present invention preferably does not include a pivot pin movably affixed to the pool wall. The ramp device 10 is preferably suspended by two flexible straps 16, rather than one flexible strap or pin, so that it remains balanced under the weight of the animal.

Since many of the trapped animals are approaching at eye level, the central member of the ramp device can be painted or otherwise marked with a light catching reflective material, or an attractive geometric pattern to distinguish it from the surrounding background of the pool water.

From the foregoing it can be realized that the described device of the present invention may be easily and conveniently utilized as a means for allowing pets and other animals to escape from a swimming pool without human assistance, so that the pool owner will not be left with drowned animals who are easily able to enter the pool when not in use, but unable to exit from it by climbing over the sides. The ramp is easily detachable and collapsible for storage, and adjustable for different pool designs and water levels. It is reliable and effective, as well as affordable.

It is to be understood that any dimensions given herein are illustrative, and are not meant to be limiting. While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A ramp device for assisting animals in escaping a swimming pool, or another body of water with a vertical or near vertical side wall, the device comprising:
   (a) a buoyant central member;
   (b) two generally mirror image, buoyant wing members movably attached to opposite sides of the central member, the wing members being smaller in size than the central member;
   (c) a means of movable attachment of the central member to a deck of the pool or the side wall; and
   (d) a mechanism for maintaining the wing members at a selected angle in relation to the plane of the central member;
      wherein, when the ramp device is in an open, deployed position, the central member floats in the water at a generally horizontal angle in relation to the downward angled wing members.

2. A ramp device according to claim 1, wherein the central member is generally tombstone-shaped with a curved leading edge, and the wing members are generally split tombstone-shaped.

3. A ramp device according to claim 2, wherein, when the ramp device is in an open, deployed position, the wing members are adjustably affixed to the central member at an angle of between about twenty (20°) and ninety (90°) degrees relative to the longitudinal axis of the central member.

4. A ramp device according to claim 3, wherein the mechanism for maintaining the wing members at an angle is at least two mirror-image spanner members, and the wing members extend down from the central member at the same angle.

5. A ramp device according to claim 3, wherein the only means of attachment to the pool deck or side wall is at least two flexible straps.

6. A ramp device according to claim 5, wherein one end of each flexible strap is affixed to a generally straight, rearward side of the central member, an opposite end of each strap being removably affixable to the pool deck or side wall.

7. A ramp device according to claim 4, wherein each of the wing members is maintained in the open, deployed position by at least one relatively rigid spanner member, each spanner member being movably affixed at one end to a corresponding wing member, and at an opposite end to a lower surface of the central member.

8. A ramp device according to claim 7, wherein an outer, longer, side of each wing member has a curved leading edge, and an adjacent, shorter side of each wing member has a straight edge coplanar with the generally straight edge of the rearward side of the central member.

9. A ramp device according to claim 8, further comprising substantially parallel grippable ridges on an upper surface of the central member.

10. A ramp device according to claim 6, wherein a free end portion of each flexible strap comprises a row of circular holes, each flexible strap being affixable to stationary bolts or pins affixed to the pool deck or side wall.

11. A ramp device according to claim 8, wherein the means of removably attaching the free ends of the spanner members to a lower surface of the central member is a clasp mechanism.

12. A ramp device according to claim 1, wherein the wing members are movably attached to opposite sides of the central member by hinges.

13. A ramp device according to claim 1, wherein the central member is not maintained at a vertical orientation with respect to a side of the pool when the device is in use.

14. A ramp device according to claim 3, wherein the mechanism for maintaining the angle of the wing members is a spanner brace extending through at least two central slots in the central member.

15. A ramp device according to claim 14, wherein opposite, flexible end portions of the spanner brace extend through corresponding wing slots in the wing members.

16. A ramp device according to claim 15, wherein the opposite flexible end portions of the spanner brace comprise hook and loop strips.

17. A ramp device according to claim 14, further comprising a plurality of concentric, grippable ridges on an upper surface of the central member and the wing members.

18. A ramp device according to claim 14, wherein the spanner brace comprises a central flexible area extending over a portion of the central member and through the central slots in the central member, two opposite ends of the central flexible area being affixed to rigid portions of the spanner brace, the rigid portions extending beneath the central member to the wing slots.

19. A ramp device according to claim 18, further comprising a plurality of parallel slits in the central member and the wing members for gripping.

20. A ramp device according to claim 1, wherein the central member and wing members are one-piece and separated by creases or folds.

* * * * *